United States Patent [19]
Cline et al.

[11] Patent Number: 6,115,048
[45] Date of Patent: Sep. 5, 2000

[54] FAST METHOD OF CREATING 3D SURFACES BY 'STRETCHING CUBES'

[75] Inventors: Harvey Ellis Cline, Schenectady; Siegwalt Ludke, Scotia, both of N.Y.

[73] Assignee: General Electric Company, Schenectady, N.Y.

[21] Appl. No.: 08/787,526

[22] Filed: Jan. 21, 1997

[51] Int. Cl.$^7$ .................................................. G06F 15/00
[52] U.S. Cl. ............................................................ 345/424
[58] Field of Search .................................. 345/421, 422, 345/424, 425, 426, 429, 430

[56] References Cited

U.S. PATENT DOCUMENTS

| | | | |
|---|---|---|---|
| 4,719,585 | 1/1988 | Cline et al. | 364/518 |
| 4,821,213 | 4/1989 | Cline et al. | 364/521 |
| 5,226,113 | 7/1993 | Cline et al. | 364/518 |
| 5,630,034 | 5/1997 | Oikawa et al. | 395/124 |
| 5,734,384 | 3/1998 | Yanof et al. | 345/424 |

*Primary Examiner*—Phu K. Nguyen
*Attorney, Agent, or Firm*—Lawrence P. Zale; Marvin Snyder

[57] ABSTRACT

A system for displaying surfaces of volumetric data determines surface cubes by a simple method without interpolation. A central voxel is selected. The central voxel is tested against a threshold. If it is below the threshold, a different voxel is chosen as a central voxel. When one is found which is above the threshold, diagonal cubes, those at each of the corners of the central voxel, are tested against the threshold. When one is encountered with at least one voxel below the threshold, it is categorized as a surface voxel. The values of the adjacent voxels are then used to determine a vector normal to the surface at the central voxel. This is repeated for a number of central voxels to determine a surface. The surface then may be displayed. If anisotropic voxels are used, the elevation angle is converted to an effective elevation angle. The normal vectors to the surface are also adjusted to compensate for the anisotropic nature of the data. The voxels are then assumed to be isotropic being displayed with the effective elevation angle and using the adjusted surface normals.

6 Claims, 5 Drawing Sheets

FAST METHOD OF CREATING 3D SURFACES BY 'STRETCHING CUBES'

BACKGROUND OF THE INVENTION

1. Field of the Invention

This invention relates to a system for rapidly displaying surfaces of computer graphic models.

2. Description of Related Art

A system for creating surfaces from volumetric data has been described in U.S. Pat. No. 4,821,213, Cline, Ludke, Lorensen, Apr. 11, 1989, "System For The Simultaneous Display Of Two Or More Internal Surfaces Within A Solid Object" ('Marching Cubes Method'). This produces surfaces efficiently, however as the number of volumetric data points becomes larger, it becomes more feasible to another method, described in U.S. Pat. No. 4,719,585, Jan. 12, 1988, Cline, Ludke, Lorensen, "Dividing Cubes System And Method For The Display Of Surface Structures Contained Within The Interior Region Of A Solid Body" ('Dividing Cubes Method'). 'The 'Dividing Cubes Method' subdivides each voxel into a points and normals using trilinear interpolation. The point and normals represent surfaces which are rendered.

Trilinear interpolation becomes computationally burdensome, especially on less powerful desktop computers which cannot perform interpolation quickly.

Therefore, there is a need for a simple computer graphic system which rapidly displays surfaces of volume data which is computationally less burdensome.

SUMMARY OF THE INVENTION

A graphics system displays surface models, such as a cube/vector model comprised of a plurality of cubes. A central voxel is selected to be tested. The central voxel is tested against a threshold, which may be provided, or predetermined. If the central voxel is below the threshold, then it is considered external to an object and a new central voxel is selected. If the central voxel is above the threshold, then 8 diagonal voxels, each sharing a vertex of the central voxel, are tested to determine if they are below the threshold value. This comparison may be done in parallel to increase speed. If at least one of the diagonal voxel values is below the threshold and the central voxel is above the threshold, then the center voxel is categorized as a surface voxel.

The above description assumes that the object desired has a high pixel value, such as bone. The present invention also works for structures with a low pixel value, such as a lung. The threshold selected has a lower value, and surface voxels are defined as central voxels which are below the threshold, with at least one diagonal voxel being above the threshold.

Threshold ranges may also be used in which the central voxel is tested to determine if it is within the threshold range, with diagonal voxels tested to determine if they are outside of the range. This is used where the object desired to be imaged has pixel values which vary over a small range.

Values of the adjacent voxels, above, below, left, right, in front of, and behind, are then used to determine a vector. This vector is corrected for anisotropic nature of the voxels, if present. Again by the parallel nature of the process, the comparison can be performed in the 'x', 'y', and 'z' dimensions simultaneously.

This process is repeated for a plurality of different central voxels to result in a plurality of surface voxels with surface normals.

An angle to view the desired surface voxels is provided, typically by an operator, but may be predetermined or selected by the system. The viewing angles are then adjusted for anisotropy to create an effective angle. The anisotropic surface voxels are then displayed as being viewed from the effective viewing angle.

If the initial voxel data used was anisotropic, the 2D images is then non-uniformly scaled to produce a non-distorted image in screen coordinates (u,v). A scaling factor $E_s$ is calculated and multiplied by each of the 'v' coordinates of the screen image to result in new screen coordinates (u,v') of a non-distorted image.

This results in a system which can rapidly produce 3D surface images on a much less powerful graphics device that was previously possible.

OBJECTS OF THE INVENTION

It is an object of the present invention to provide a computer graphic system which rapidly displays surfaces of volumetric data.

It is another object of the present invention to provide a method of surface rendering which displays surfaces of volumetric data at the same speed as conventional systems using much less powerful equipment.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

On a low end graphics system, such as a desktop personal computer ("PC"), there may not be a 3D graphics accelerator card used for rendering surfaces of a 3D polygonal model. The 'Dividing Cubes Method' referenced above, operating on a PC without a graphics card, will render models at speeds far lower than required to produce real-time images. This may make the system impractical for use in a clinical setting, where a Physician may need interactive real-time feedback.

Another problem is that the 'Dividing Cubes Method' requires a large memory to store the display list used in connection with the method. This may make the memory requirements too large to run on a PC.

If a 3D model of sampled data can be rendered without interpolation, there would be a large gain in efficiency.

However, many data sets which are acquired, such as those from Computed Axial Tomography (CAT), are anisotropic. The data may be acquired with other means such as Magnetic Resonance (MR) Ultrasound, or other imaging devices.

Figure 1:
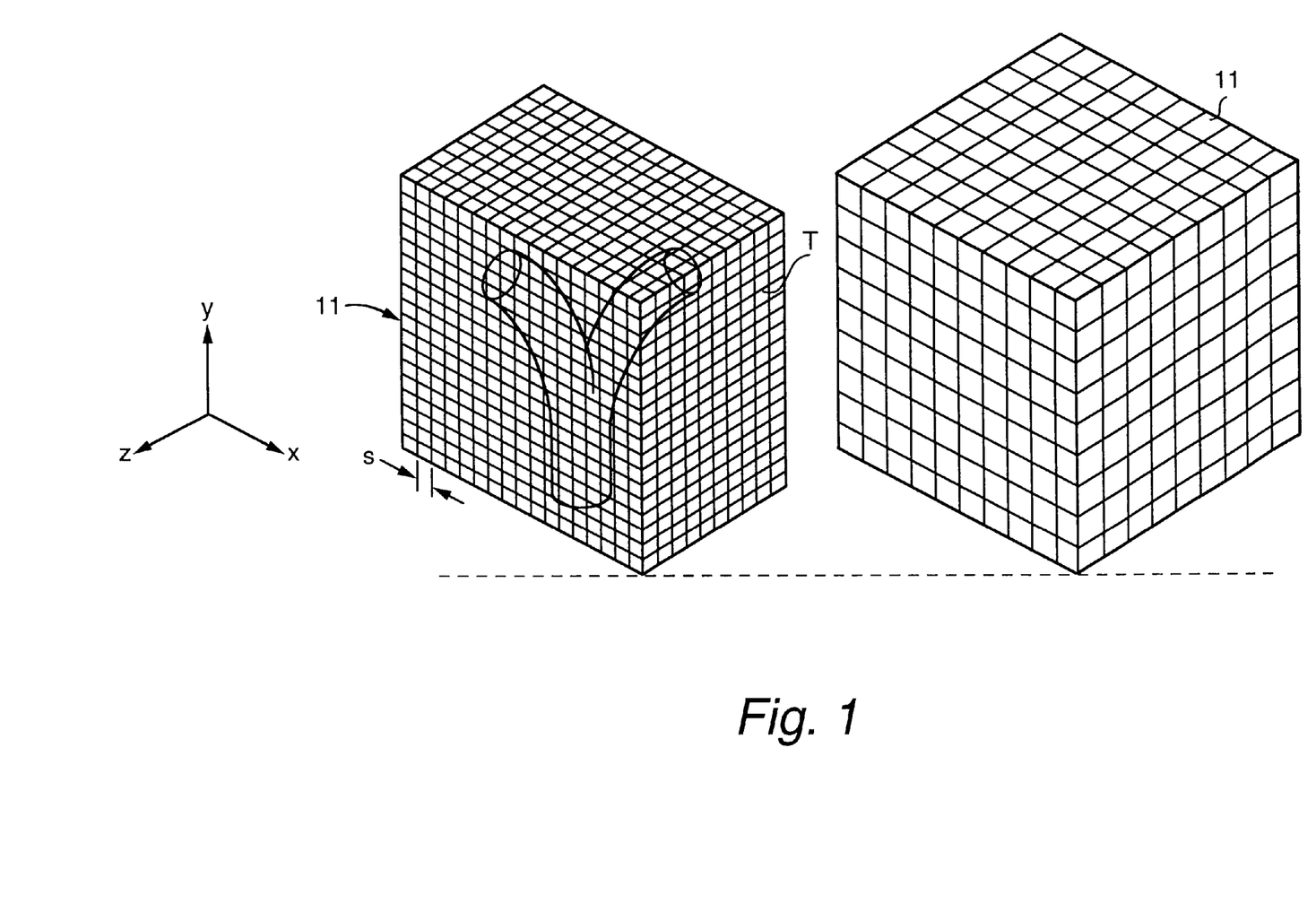
FIG. 1 is an illustration voxels of isotropic and anisotropic volumetric data.

An isotropic volume data 12, and an anisotropic data set 11 are shown in FIG. 1. The volume data sets having volume pixels ('voxels'), which each have a data values which indicates a physical property measured at its center. The spacing T between 'slices' of data in one dimension, do not equal the spacing between data point in the other dimensions, S in volume data set 11, making it anisotropic. The imaging device may also store the spacing between adjacent data points and between slices of data in the data set. If one were to render surfaces of anisotropic the voxels without interpolation, the resulting image will be distorted.

The coordinate system for data set 11 is shown with the long axis of the voxels being aligned along the 'z' axis.

Volume data set 12 is isotropic having equal spacing, S, in all dimensions, with each voxel having a cube shape.

Determining Surface Voxels

Figure 2:
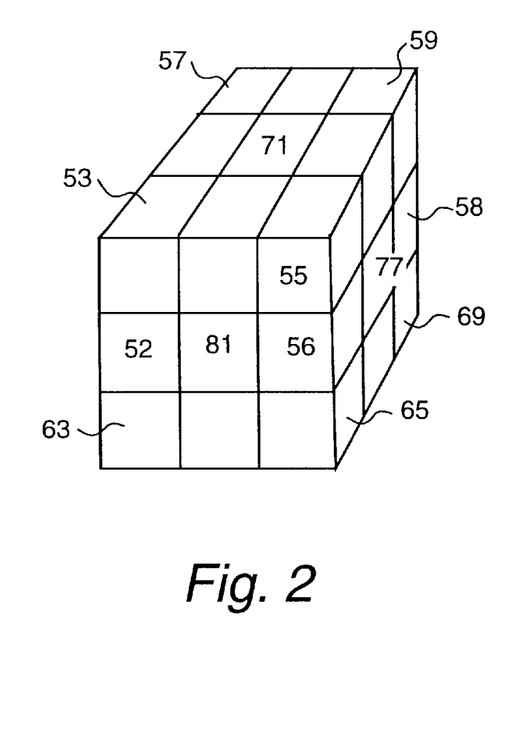
FIG. 2 is an illustration identifying voxels of volumetric data used to determine surface voxels according to the present invention.
Figure 3:
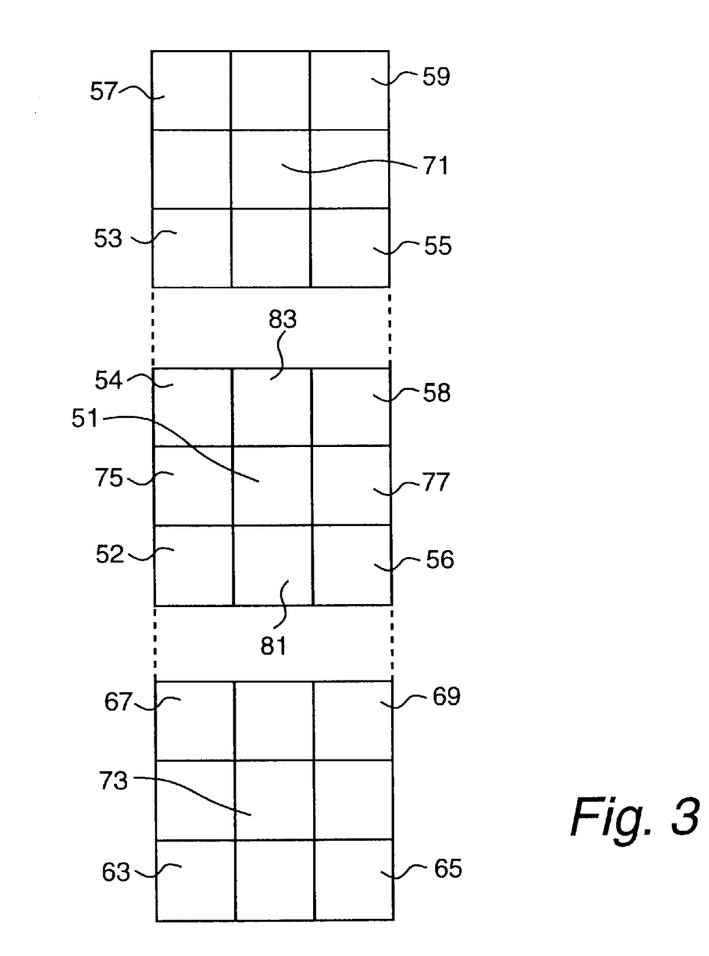
FIG. 3 is an illustration identifying voxels of volumetric data used to determine surface voxels according to the present invention.

Surfaces within the volume data set are desired to be imaged. A subset of voxels of the volumetric data set are shown in FIG. 2. A view of each of the layers of voxels are shown in FIG. 3 in a diagrammatic form.

The present invention functions by selecting a voxel as a central voxel 51. Central voxel 51 is then tested against a threshold, which may be provided by an operator, or predetermined. If central voxel 51 is below the threshold, then it is considered external to an object and a new central voxel is selected. If the central voxel is above the threshold, then diagonal voxels, each sharing a vertex of the central voxel, are tested to determine if they are below the threshold value.

Diagonal voxels 53, 55, 57, 59, 63, 65, 67, 69 each share a single corner with central voxel 51. If at least one diagonal voxel is above the threshold, then central voxel 51 is categorized as a surface voxel. These comparisons may be done in parallel to increase speed.

The above description assumes that the object desired has a high pixel value, such as bone. The present invention also works for desired structures with a low pixel value, such as a lung. In this case, a lower threshold is selected. Surface voxels are now defined as central voxels having values below the threshold, with at least one diagonal voxel being above the threshold.

Threshold ranges may also be used in which central voxel 51 is tested to determine if it is within the threshold range, with diagonal voxels tested to determine if at least one is outside of the range. This is used where the object desired to be imaged has pixel values which vary over a small range.

The central voxel is incremented to another voxel, typically a next neighboring voxel. A new 3×3×3 group of voxels is then chosen, and the process is repeated. This continues until all voxels have been tested.

In another embodiment, additional voxels may be tested after the central voxel, such as middle layer voxels 52, 56, 54, 58. This provides additional accuracy as a tradeoff against speed.

Displaying the Distorted Image

If one were to use isotropic voxels having dimensions (S, S) in place of anisotropic voxels having dimensions (S, T) and correct for the differences, imaging would be much faster since there would be no need for interpolation.

Typically, an operator provides a viewing angles (elevation, azimuth, roll) in which the surface voxels are to be viewed. The viewing angles may also be predetermined or scanned through a preset range. The viewing angles are defined as rotations about the 'x', 'y', 'z' axes, respectively, and in that order.

In imaging typically only the azimuth angle and the elevation angle are used. Take for example an image of a subject's head as it would appear with the subject standing facing you. The 'x' axis would pass through the subject's ears, the 'y' axis through the top of the head through the center of the neck. The 'z' axis would pass through the nose head and exit through the back of the skull. A rotation about the 'x' axis would cause the head to rotate up and down, as in signaling 'yes'. A rotation about the 'y' axis would rotate the head side to side, as in signaling 'no'. A rotation about the 'z' axis merely rotates the image upside down. Therefore, the last of the three orientation angles, roll, has little effect on an image since it is the equivalent of rotating a screen image in a clockwise or counterclockwise fashion. For imaging purposes, only azimuth and elevation will be analyzed.

An azimuth angle rotation, if performed first, and the volume data set is aligned such that the axis of azimuth rotation is parallel to the long axis of the anisotropic voxels, the result is the same as using isotropic voxels.

Therefore, the only viewing angle left to correct is elevation. In U.S. Pat. No. 5,226,113, Jul. 6, 1993, by Cline, Ludke, Dumoulin, Souza, "Method and Apparatus for Volumetric Projection Rendering Using Reverse Ray Casting", assigned to the present Assignee and hereby incorporated by reference, anisotropy in projection images was corrected after the image was created by stretching the resulting image to provide an accurate projection.

Figure 4:
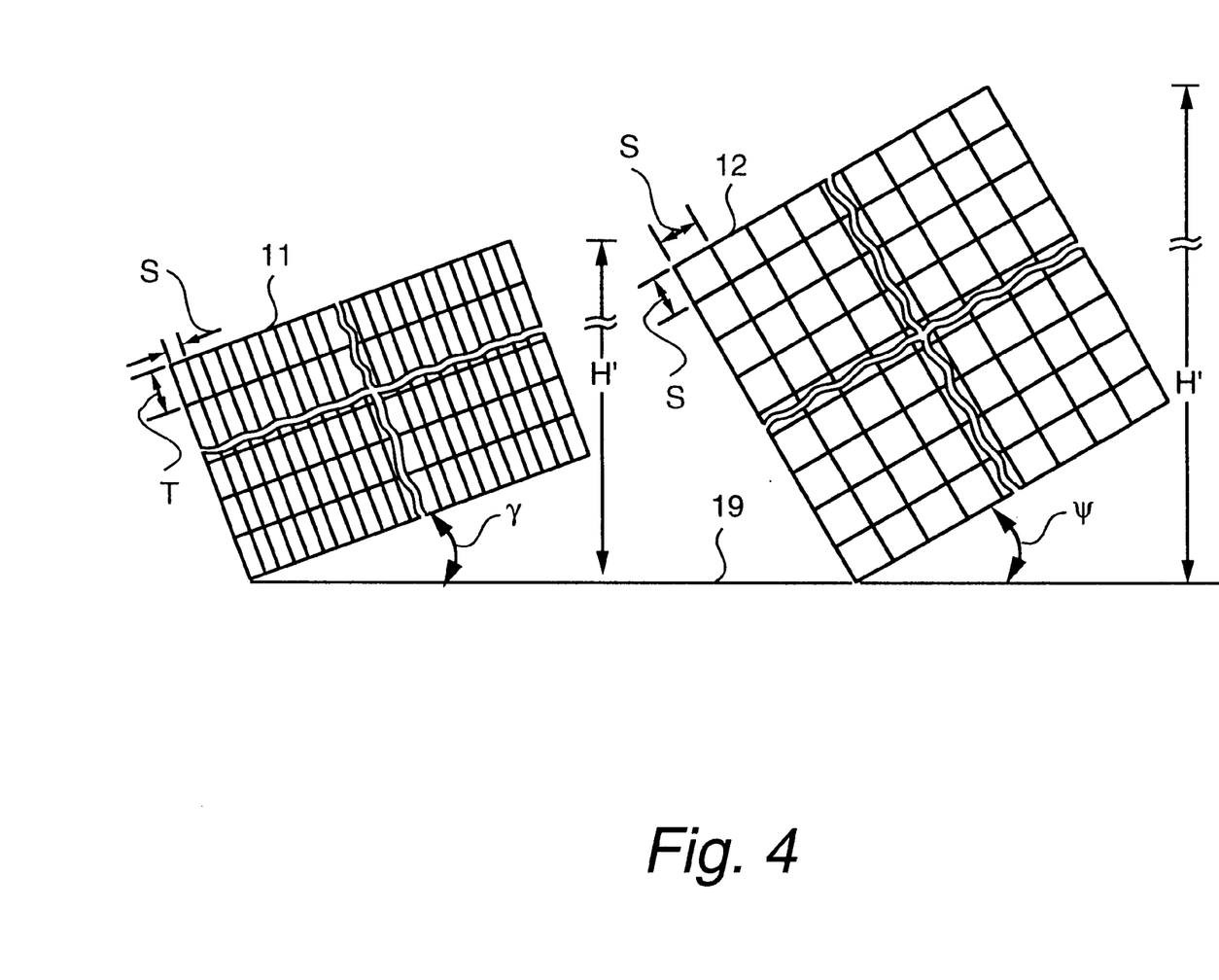
FIG. 4 is an illustration of the effect of anisotropy on elevation angles.

FIG. 4 shows anisotropic volume data voxels 11 and isotropic volume data voxels 12 in a side view showing the effect of anisotropy on elevation angle. If one desired to view the surface voxels at an elevation angle γ, it would effectively be an angle ψ using isotropic data. γ is converted to ψ according to:

$$\psi = \arctan(\tan(\gamma)/A)$$

where $$A = T/S.$$

Surface Normals

For each surface voxel, a normal vector to the surface is created. For each surface voxel, shown as central voxel 51 in FIG. 3, six neighbor voxels are used to determine a surface normal vector. A lower voxel 73, immediately below central voxel 51, has its value subtracted from an upper voxel 71 to determine a difference in the 'y' direction. Similarly, a left voxel 75 is subtracted from a right voxel 77 to result in an 'x' difference. And a value of front voxel 81 is subtracted from a value of rear voxel 83 to result in a 'z' difference. The 'x', 'y', 'z' differences are used to determine a magnitude g according to:

$$g = \text{sqrt}\{('x'\text{ diff})^2 + ('y'\text{ diff})^2 + ('z'\text{ diff})^2\};$$

where

'x' diff=voxel 77−voxel 75,

'y' diff=voxel 71−voxel 73, and

'z' diff=voxel 83−voxel 81.

Each is normalized according to:

$$N_x = 'x'\text{ diff}/g$$

$$N_y = 'y'\text{ diff}/g$$

$$N_z = 'z'\text{ diff}/(A*g);$$

and $$A = T/S;$$

where A is an aspect ratio being the ratio of the long side of the voxel, T, to either shorter equal sides, S.

Together ($N_x$, $N_y$, $N_z$) defines a vector 85 normal to a surface located at central voxel 51. This is repeated with each of the surface voxels as central voxel 51.

Stretching the Image

The use of anisotropic voxels, beside requiring correction to the viewing angles ψ, also requires correction to screen height H', H.

A scale factor $E_s$ is used to multiply the coordinates of the image produced to offset the image in one screen direction, but not the second. The surface voxels are then display as viewed from (azimuth, ψ) to result in pixels each having screen locations (u,v). If the coordinate system is set up for the elevation angle to be measured from an axis perpendicular to the long axis of the anisotropic voxels, then the vertical screen coordinates 'v' coordinates, are multiplied by a scaling factor $E_s$ as defined below:

$$E_s = \text{sqrt}((A \cos (\gamma))^2 + \sin^2 (\gamma))$$

$$(u, v') = (u, v^*E_s).$$

Figure 5:
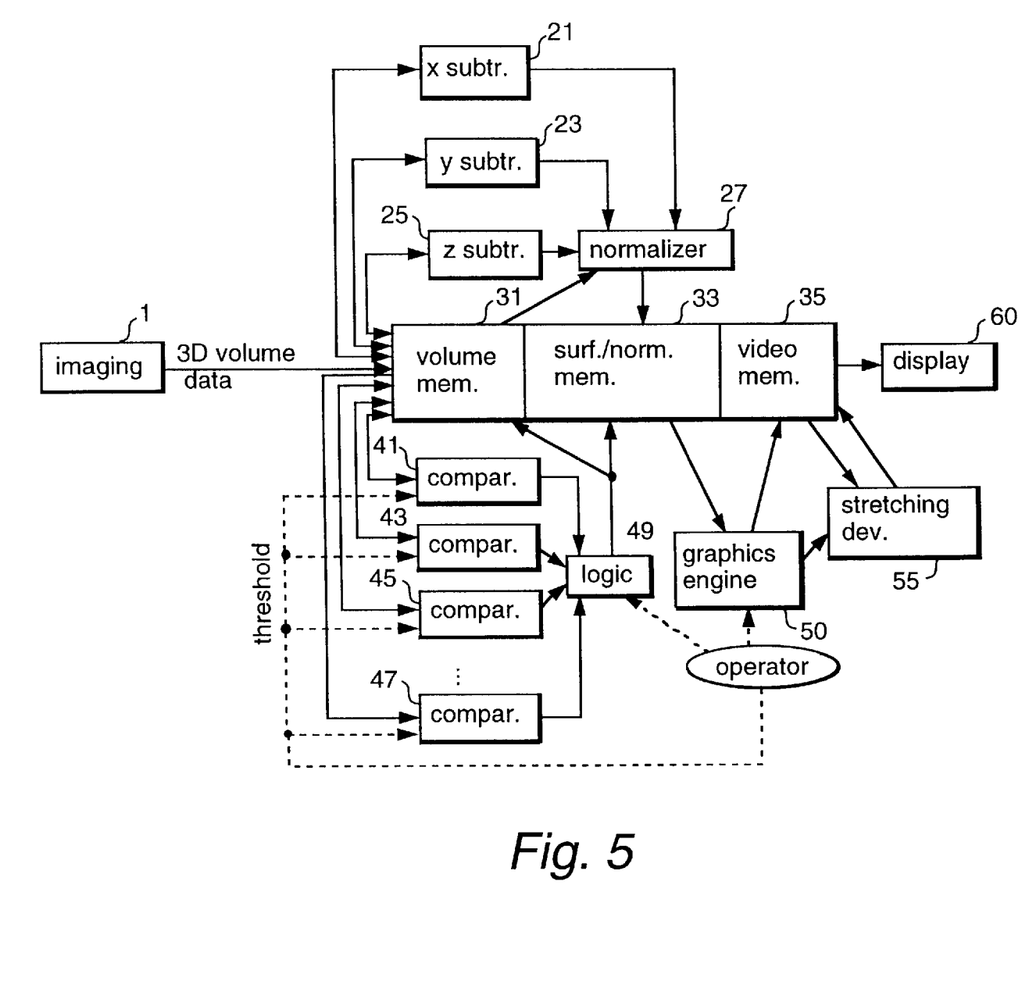
FIG. 5 is a simplified block diagram of a computer graphic modeling system according to the present invention.

FIG. 5 show a simplified block diagram of the present invention. An imaging device 1 creates a volumetric data set. In addition to the devices mentioned above, CAD, RADAR, or other measurement device which produces volumetric data may be employed.

The 3D volumetric data set is stored in a volume memory 31 which may be a portion of a larger shared memory 30. It may also store either an aspect ratio A, or dimensions of the anisotropic voxels.

A logic device determines a central voxel to be tested. It stores the location (index) of central voxel 51, or passes it directly to a comparitor 41. Comparitor 41 also receives a threshold value defining an isosurface. This may be manually provided by an operator, predetermined, or calculated and received from another device. As described above, a threshold range may also be used and voxels tested to determine if they are within or outside of a threshold range. Comparitor 41 then extracts the central voxel value from volume memory 31. It then tests if the central voxel value against the threshold. If central voxel is below the threshold, it indicates so to logic device 49 which chooses another central voxel index, and the process is repeated (assuming that the desired object has a high voxel value as discussed above).

If the value of the central voxel is above the threshold, then a plurality of comparitors 43, 45, 47 each receive the threshold value, the index of the central voxel from volume memory 31 and each extracts a diagonal voxel, such as 53, 55, 57, 59, 63, 65, 67, 69 of FIGS. 2,3 from volume memory 31. The diagonal voxels are all neighbors of a central voxel 51. Each comparitor compares the value of the diagonal voxel to the threshold received.

The results of the comparison are passed to a logic device 49 which determines if there is at least one diagonal voxel value below the threshold, indicating a surface voxel.

Logic device 49 saves surface voxel location (or data set indices) in a surface/normal memory 33, which may be a portion of a shared memory 30. Each time a surface voxel is encountered, logic device indicates the location (or indices) of the surface voxel to 'x', 'y', and 'z' subtraction devices, 21, 22, 23, respectively, either directly, or through shared memory.

An 'x' subtraction device 21 decrements the 'x' index of the surface voxel index to get left voxel 75. It then increments the 'x' index of the surface voxel index to get a value of right voxel 77. It then subtracts the left voxel from the right voxel to determine an 'x' difference.

Similarly, a 'y' subtraction device 23 decrements and increments the surface voxel 'y' index to get lower, upper voxels 73, 71 and determines a 'y' difference.

Finally, a 'z' subtraction device 25 decrements and increments the surface voxel 'z' index to get front, rear voxels 81, 83 and determines a 'z' difference.

A normalizer 27 receives the 'x', 'y', 'z' differences, and computes a magnitude g according to:

$$g = \text{sqrt}(('x' \text{ diff})^2 + ('y' \text{ diff})^2 + ('z' \text{ diff})^2).$$

Normalizer 27 reads from volume memory 31, or calculates, the aspect ratio A, and vector components $N_x$, $N_y$, $N_z$ according to:

$$N_x = ('x' \text{ diff})/g;$$

$$N_y = ('x' \text{ diff})/g;$$

$$N_z = ('x' \text{ diff})/(A^*g).$$

$N_x$, $N_y$, $N_z$ define a vector 85 normal to the surface at the location of central voxel 51, which is stored along with the location (indices) of the surface voxel which it is associated with in surface/normal memory 33.

This is repeated until all voxels intended to be rendered are tested. A graphics engine 50 reads the entries of surface/normal memory 33 and also receives a desired viewing angles (azimuth, elevation γ, roll) which may be manual input from and operator, predetermined, or provided by another device. Graphics engine 50 converts the desired elevation angle γ to an effective elevation angle ψ for anisotropic data as set forth above, then renders desired surfaces as viewed from (azimuth, effective elevation ψ). Graphics engine 50 stores its output as 2D screen pixel data in a video memory 35. In the case of isotropic data, the 2D screen pixel data may then be displayed on a display device 60.

When anisotropic data set is used, a stretching device 55 is coupled to the video memory 35, reads the 2D screen pixel data, receives the elevation viewing angle and multiplies the vertical location 'v' of each of the screen pixel locations by scaling factor $E_s$ according to:

$$E_s = \text{sqrt}(A \cos (\gamma))^2 + \sin^2 (\gamma)).$$

$$(u, v) = (u, E_s^*v).$$

This offsets the data value locations of the 2D screen pixel data, according to the relative ratio of non-uniformity of the voxel spacing and the viewing angle, in effect, distorting the image in an opposite direction to the distortion incurred by anisotropy.

The video memory 35 may then be displayed on display device 60 showing correctly rendered surfaces.

Figure 6:
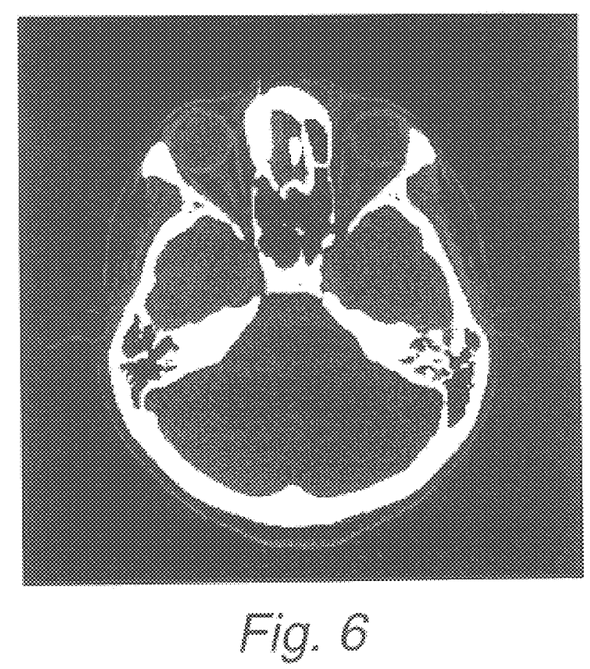
FIG. 6 is an image of a single slice of Computed Tomography volumetric data set acquired from a subject's head.

FIG. 6 is a single slice of computed tomography (CT) volumetric data of a subject's head. This is one of 93 slices in the volumetric data set, having pixel sizes, S, equal to 1.5 mm.

Figure 7:
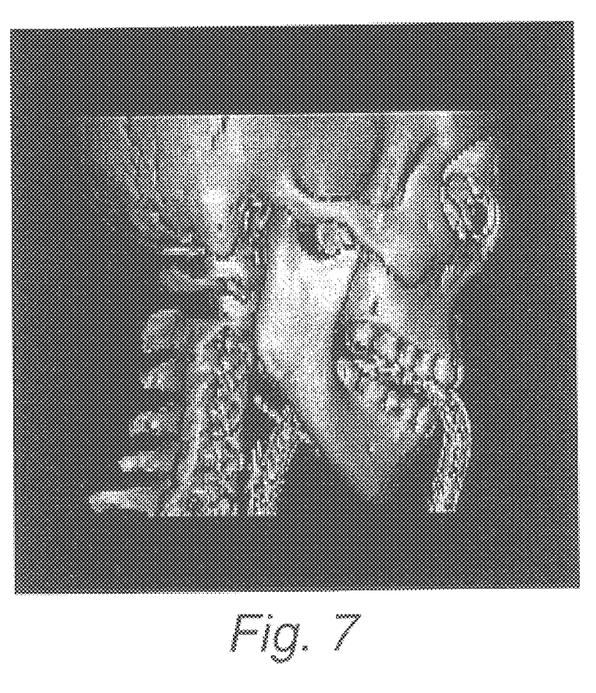
FIG. 7 is a 3D image of bone surfaces of the volumetric data set used to create FIG. 6.

The volumetric data set used to create the image of FIG. 6 was processed according to the present invention employing a PC. The 3D image of FIG. 7 was produced with the present invention using a threshold of 224 Hounsfield units.

While several presently preferred embodiments of the present novel invention have been described in detail herein, many modifications and variations will now become apparent to those skilled in the art. It is our intent therefore, to be limited only by the scope of the appending claims and not by the specific details presented by way of illustration.

What we claim is:

1. A method of displaying surfaces without interpolation, of volumetric data, having voxels with an aspect ratio A, voxel values each at a specified location and index, comprising the steps of:
   a) selecting a central voxel;
   b) testing the central voxel against a predetermined threshold;
   c) for each central voxel above the predetermined threshold:
      i. determining a plurality of diagonal voxels and their values relative to the central voxel;
      ii. comparing each diagonal voxel value to the predetermined threshold;
      iii. categorizing the central voxel as a surface voxel, if at least one diagonal voxel value is below the threshold;
      iv. calculating a surface normal vector for each surface voxel from differences between values of voxel straddling the central voxel;
   d) repeating steps "a"–"c" for a plurality of different voxels as the central voxel to result in a plurality of surface voxels and surface normal vectors;
   e) receiving a viewing angle of a desired view of the surface voxels;
   f) rendering the surface voxels and surface normal vectors at a desired viewing angle (azimuth, elevation $\gamma$) to screen pixel data each having an (u,v) screen location, pixel color, and intensity as viewed from a modified viewing angle taking into account said aspect ratio, A;
   g) displaying the pixel data as an image to an operator.

2. The method of displaying surfaces of volumetric data of claim 1 wherein the step of calculating a surface normal comprising the steps of:
   a) selecting an adjacent voxel to the left of the central voxel as a left voxel;
   b) selecting an adjacent voxel to the right of the central voxel as a right voxel;
   c) subtracting the left voxel from the right voxel to determine an 'x' difference;
   d) selecting an adjacent voxel in front of the central voxel as a front voxel;
   e) selecting an adjacent voxel behind the central voxel as a rear voxel;
   f) subtracting the front voxel from the rear voxel to determine an 'y' difference;
   g) selecting an adjacent voxel below the central voxel as a lower voxel;
   h) selecting an adjacent voxel above the central voxel as an upper voxel;
   i) subtracting the lower voxel from the upper voxel to determine an 'y' difference;
   j) normalizing the 'x','y','z' differences into vector components $N_x$, $N_y$, $N_z$ according to:

$g = \text{sqrt}(\text{'x' difference}^2 + \text{'y' difference}^2 + \text{'z' difference}^2)$ $N_x = \text{'x' difference}/g;$ $N_y = \text{'y' difference}/g;$ $N_z = \text{'z' difference}/(A*g);$ k) storing vector components $N_x$, $N_y$, $N_z$ as a surface normal vector along with its associated voxel index, or location.

3. The method of displaying surfaces of volumetric data of claim 1 further comprising, before the step of display, the step of:
   offsetting the (u,v) locations of the pixel data to new locations (u,v') so as to scale the image according to:

$E_s = \text{sqrt}(A \cos(\gamma))^2 + \sin^2(\gamma));$ $(u,v') = (u, E_s * v);$ where $\gamma$ is elevation of the desired viewing angle.

4. The method of displaying surfaces of volumetric data of claim 1 further comprising, before the step of rendering, the step of:
   adjusting the elevation angle $\gamma$ into an effective elevation angle $\psi$ according to:

$\psi = \tan^{-1}((1/A)(\tan(\gamma)),$ and the effective elevation $\psi$ is used in place of elevation angle $\gamma$ to render the surface voxels.

5. A graphics system for displaying surfaces of volumetric data, having voxels values each at a specified location, and index, without interpolation, comprising:
   a) a volumetric memory adapted for storing said volumetric data;
   b) a plurality of comparitors each coupled to the volumetric memory, for reading an indices of a central voxel, offsetting the indices to determine a diagonal voxel, and for comparing the diagonal voxel value with a predetermined threshold;
   c) a surface/normal memory capable of storing surface voxel indices and vectors normal to the surface for each surface voxel;
   d) a logic device coupled to the comparators for selecting an index for each central voxel, and storing the indices of the central voxel in the volume memory, for receiving the output of the comparitors, and for categorizing central voxels as a surface voxel if at least one of their diagonal voxel values tests to be on the opposite side of the threshold from its own test, and for storing indices of surface voxels in the surface normal memory;
   e) an 'x' subtraction device for calculating indices of voxels straddling the central voxel in the 'x' direction, and subtracting these voxel values to result in a 'x' difference;
   f) an 'y' subtraction device for calculating indices of voxels straddling the central voxel in the 'y' direction, and subtracting these voxel values to result in a 'y' difference;
   g) an 'z' subtraction device for calculating indices of voxels straddling the central voxel in the 'z' direction, and subtracting these voxel values to result in a 'z' difference;
   h) a normalizer coupled to the subtraction devices for receiving the 'x', 'y', 'z' differences and normalizing then into a surface vector components ($N_x$, $N_y$, $N_z$) and storing the vector components in the surface/normal memory;
   i) a graphics engine, coupled to the surface/normal memory, for receiving and adjusting the viewing angle for anisotropy, for reading in the surface voxel indices and normal vectors and for creating pixel data, being screen locations (u,v) and pixel color, for rendering a surface viewed from the desired viewing angle, and storing the pixel data in a video memory;

f) a display device coupled to the video memory, for displaying the pixel data as an image.

6. A graphics system of claim 5 further comprising: a stretching device coupled to the video memory, for receiving the pixel data, and the viewing angle, and offsetting the (u,v) locations of the pixel data to new locations (u,v') so as to scale the image according to:

$$E_s = \text{sqrt}(A \cos(\gamma))^2 + \sin^2(\gamma)).$$

$$(u,v) = (u, E_s * v);$$

where A is an aspect ratio of the voxels of the volumetric data, $\gamma$ is elevation of the desired viewing angle such that the image is stretched to correct distortion caused by anisotropy.

* * * * *